(12) United States Patent
Uesaka et al.

(10) Patent No.: US 8,614,272 B2
(45) Date of Patent: Dec. 24, 2013

(54) TIRE RUBBER COMPOSITION AND PNEUMATIC TIRE

(75) Inventors: Kenichi Uesaka, Kobe (JP); Tetsuya Kunisawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 162 days.

(21) Appl. No.: 13/079,041

(22) Filed: Apr. 4, 2011

(65) Prior Publication Data

US 2011/0245370 A1    Oct. 6, 2011

(30) Foreign Application Priority Data

Apr. 5, 2010    (JP) ................................. 2010-087324
Jun. 28, 2010    (JP) ................................. 2010-146706

(51) Int. Cl.
*C08K 3/36* (2006.01)
*C08L 83/04* (2006.01)

(52) U.S. Cl.
USPC ............................ 524/493; 524/506; 524/572

(58) Field of Classification Search
USPC ......................... 524/493, 506, 572
See application file for complete search history.

(56) References Cited

U.S. PATENT DOCUMENTS

| 4,977,220 | A | 12/1990 | Dougherty et al. | |
| 2008/0033103 | A1* | 2/2008 | Kameda et al. ................ | 524/571 |
| 2010/0099795 | A1 | 4/2010 | Uesaka | |
| 2010/0105826 | A1 | 4/2010 | Uesaka | |

FOREIGN PATENT DOCUMENTS

| EP | 1882716 A1 | 1/2008 | | |
| JP | 2001-114938 A | 4/2001 | | |
| JP | 2002-179729 A | 6/2002 | | |
| JP | 2005-154769 A | 6/2005 | | |
| JP | 2006-306962 | * 11/2006 | ................ | C08L 9/06 |
| JP | 2006-306962 A | 11/2006 | | |
| JP | 2006-306962 A | * 11/2006 | ................ | C08L 9/06 |
| JP | 2009-120819 A | 6/2009 | | |
| JP | 2009-263420 | * 11/2009 | ................ | C08L 9/00 |
| JP | 2009-263420 A | 11/2009 | | |
| JP | 2009-263420 A | * 11/2009 | ................ | C08L 9/00 |
| WO | WO 2006/028254 A1 | 3/2006 | | |
| WO | WO 2009/147006 A1 | 12/2009 | | |

OTHER PUBLICATIONS

JP2009-263420A—machine translation.*
JP2006-306962A—machine translation.*

* cited by examiner

*Primary Examiner* — Ling Choi
*Assistant Examiner* — Ronald Grinsted
(74) *Attorney, Agent, or Firm* — Birch, Stewart, Kolasch & Birch, LLP

(57) ABSTRACT

The invention aims to provide a tire rubber composition that is excellent in the low heat build-up property (fuel economy), wet grip performance, and abrasion resistance, and can be suitably used for a tread (cap tread); and a tire rubber composition that is excellent in the low heat build-up property and breaking properties, and can be suitably used for a base tread or sidewall. The composition comprises: a diene polymer; and silica, the diene polymer being a modified diene polymer obtainable by reacting compounds (A) and (B), the compound (A) being an active alkali metal-terminated conjugated diene polymer obtainable by polymerizing a conjugated diene monomer alone or with an aromatic vinyl monomer, in the presence of compound (C), the compound (B) being a modifying agent having a functional group, and the compound (C) being a chemical species obtainable by reacting an organic alkali metal compound with compound of formula (1):

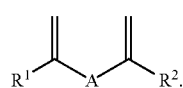

(1)

16 Claims, No Drawings

TIRE RUBBER COMPOSITION AND PNEUMATIC TIRE

TECHNICAL FIELD

The present invention relates to a tire rubber composition and a pneumatic tire produced using the rubber composition.

BACKGROUND ART

Conventionally, fuel economy of automobiles has been improved by reducing the rolling resistance of tires (i.e. by improving the rolling resistance property). Still, in these years, there is an increasingly growing demand for a reduction in fuel consumption of automobiles. With this demand has come a demand for a rubber composition with very low heat build-up which is used for producing a tread, which occupies a larger portion of a tire among various tire components.

For example, a method is known in which a tire is designed to have a double-layer tread part (i.e. a base tread and a cap tread), and a rubber composition with low heat build-up is used for the base tread. Still, there is a need for further reduction in heat build-up. Likewise, there is a demand for a rubber composition with lower heat build-up for use in tire components other than a tread, and sidewalls, which generate larger quantities of heat due to deformation, are also required to provide lower heat build-up.

Known as a method for producing a rubber composition with sufficiently low heat build-up is a method of reducing the amount of reinforcing filler in the rubber composition. In this case, however, the hardness of the rubber composition is decreased, and thereby tires produced therefrom are softer. Such tires may disadvantageously impair handling performance (handling stability) of automobiles and exhibit low wet grip performance and abrasion resistance. The strength of the rubber composition is also lowered and disadvantageously the tires will be easily damaged.

Patent Document 1 teaches that use of a modified styrene-butadiene rubber, which is modified with a predetermined organic silicon compound containing an alkoxy group, enables lower heat build-up, improved wet grip performance, and improved abrasion resistance. However, in order to achieve satisfactory levels of all of these performances, there remains a need for further studies. The breaking properties of the rubber composition should also be improved. The modified styrene-butadiene rubber used has only one modified end, and modification of both or two or more ends is not examined.

Patent Document 1: JP-A 2001-114938

SUMMARY OF THE INVENTION

The present invention aims to solve the above problems, and an object of the present invention is to provide a tire rubber composition that is excellent in the low heat build-up property (fuel economy), wet grip performance, and abrasion resistance, and can be suitably used for, in particular, a tread (cap tread). A further object of the present invention is to provide a tire rubber composition that is excellent in the low heat build-up property and breaking properties, and can be suitably used for, in particular, a base tread or sidewall. A still further object of the present invention is to provide a pneumatic tire with a tire component (tread part (cap tread, base tread), sidewall, etc.) produced from the tire rubber composition.

The present invention relates to a tire rubber composition comprising: a rubber component including a diene polymer; and silica, the diene polymer being a modified diene polymer obtainable by reacting a compound (A) and a compound (B), the compound (A) being an active alkali metal-terminated conjugated diene polymer obtainable by polymerizing a conjugated diene monomer alone or with an aromatic vinyl monomer, in the presence of a compound (C), the compound (B) being a modifying agent having a functional group, and the compound (C) is a chemical species obtainable by reacting an organic alkali metal compound with a compound represented by the following formula (1):

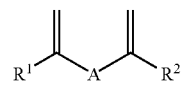

(1)

wherein $R^1$ and $R^2$ are the same as or different from each other and each represents a hydrogen atom, a branched or unbranched alkyl group, an aryl group, a branched or unbranched alkoxy group, a branched or unbranched silyloxy group, a branched or unbranched acetal group, a carboxyl group, a mercapto group, or a derivative thereof; and A represents a branched or unbranched alkylene group, an arylene group, or a derivative thereof.

The compound represented by the formula (1) is preferably a compound represented by the following formula (2).

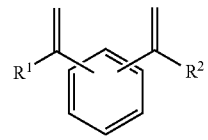

(2)

The above modifying agent is preferably a compound represented by the following formula (3):

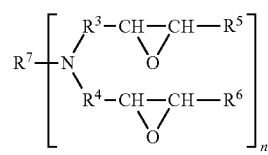

(3)

wherein $R^3$ and $R^4$ are the same as or different from each other and each represents a $C_{1-10}$ hydrocarbon group, and the hydrocarbon group may have at least one selected from the group consisting of an ether group and a tertiary amine group; $R^5$ and $R^6$ are the same as or different from each other and each represents a hydrogen atom or a $C_{1-20}$ hydrocarbon group, and the hydrocarbon group may have at least one selected from the group consisting of an ether group and a tertiary amine group; $R^7$ represents a $C_{1-20}$ hydrocarbon group, and the hydrocarbon group may have at least one selected from the group consisting of an ether group, a tertiary amine group, an epoxy group, a carbonyl group, and a halogen; and n is an integer of 1 to 6.

Preferably, the compound (B) is a single modifying agent, and the modifying agent is introduced into both ends of the active conjugated diene polymer.

In the tire rubber composition, the amount of the diene polymer is preferably not less than 5% by mass in 100% by mass of the rubber component.

Preferably, the conjugated diene monomer is 1,3-butadiene and/or isoprene, and the aromatic vinyl monomer is styrene.

The silica preferably has a nitrogen adsorption specific surface area of 40 to 250 m²/g.

The tire rubber composition preferably further comprises:

a silane coupling agent represented by the following formula (4); and/or a silane coupling agent that is a copolymer comprising units A represented by the following formula (5) and units B represented by the following formula (6), wherein the proportion of the units B is 1 to 70 mol % of the total molar amount of the units A and the units B:

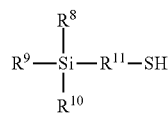
(4)

wherein $R^8$ represents a group represented by the formula: $-O-(R^{12}-O)_m-R^{13}$, m $R^{12}$s may be the same as or different from each other and each represents a branched or unbranched $C_{1-30}$ divalent hydrocarbon group, $R^{13}$ represents a branched or unbranched $C_{1-30}$ alkyl group, a branched or unbranched $C_{2-30}$ alkenyl group, a $C_{6-30}$ aryl group, or a $C_{7-30}$ aralkyl group, and m is an integer of 1 to 30; $R^9$ and $R^{10}$ are the same as or different from each other and each represents the same group as $R^8$, or a branched or unbranched $C_{1-12}$ alkyl group or a group represented by the formula $-O-R^{14}$, and $R^{14}$ represents a hydrogen atom, a branched or unbranched $C_{1-30}$ alkyl group, a branched or unbranched $C_{2-30}$ alkenyl group, a $C_{6-30}$ aryl group, or a $C_{7-30}$ aralkyl group; and $R^{11}$ represents a branched or unbranched $C_{1-30}$ alkylene group,

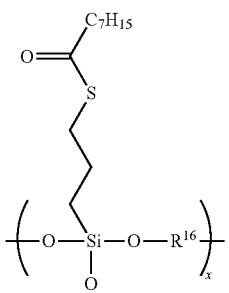
(5)

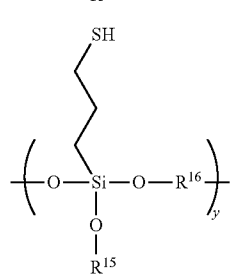
(6)

wherein x and y each represent an integer of 1 or larger; $R^{15}$ represents hydrogen, a halogen, or a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group obtained by replacing the end of the alkyl or alkenyl group with a hydroxy or carboxyl group; $R^{16}$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group; and $R^{15}$ and $R^{16}$ may form a ring together.

The tire rubber composition preferably further comprises a vulcanization accelerator represented by the following formula (7):

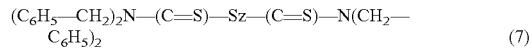
(7)

wherein z is an integer of 1 to 8.

The tire rubber composition is preferably used as a rubber composition for a tread. Alternatively, the tire rubber composition is preferably used as a rubber composition for a cap tread. Here, the modified diene polymer is preferably a modified styrene-butadiene rubber obtainable by polymerizing 1,3-butadiene and styrene.

Preferably, the tire rubber composition is used as a rubber composition for a base tread and/or a rubber composition for a sidewall, and the modified diene polymer is obtainable by polymerizing the conjugated diene monomer. Here, the modified diene polymer is preferably a modified butadiene rubber obtainable by polymerizing 1,3-butadiene.

The present invention also relates to a pneumatic tire comprising one or more tire components produced from the rubber composition. Here, the one or more tire components preferably comprise at least one selected from the group consisting of a cap tread, a base tread and a sidewall.

Since the tire rubber composition according to the present invention contains a specific modified diene polymer and silica, the tire rubber composition is excellent in all of the low heat build-up property (fuel economy), wet grip performance, and abrasion resistance, and is excellent in both of the low heat build-up property and breaking properties. By using the rubber composition for tire components such as a tread (cap tread), a base tread, and a sidewall, a pneumatic tire excellent in the above performances is provided.

BEST MODE FOR CARRYING OUT THE INVENTION

The tire rubber composition of the present invention contains a specific modified diene polymer (hereinafter, also referred to as the modified diene polymer) and silica.

Since, in the present invention, the chemical species (C), which is obtainable by reacting the compound represented by the formula (1) and an organic alkali metal compound, serves as a polymerization initiator in the polymerization reaction, both ends of the polymer chain (compound (A) (active conjugated diene polymer)) produced by the polymerization reaction are living polymer ends. Therefore, in the present invention, both ends of the active conjugated diene polymer (A) can be modified with the modifying agent (B). Compared to the case that only one end of the polymer is modified, the rubber composition of the present invention is excellent in the low heat build-up property, wet grip performance, and abrasion resistance, and these performances are improved in a balanced manner. Also, the rubber composition of the present invention is excellent in both of the low heat build-up property and breaking properties. On the other hand, there can be one alternative method for introducing a functional group (modifying group) to both ends of the polymer. In this method, polymerization is carried out using a polymerization initiator having a functional group, and a modifying agent is reacted with an end of the polymer. In this case, the resulting polymer has the functional group derived from the polymerization initiator at one end and the functional group derived from the modifying agent at the other end. Since the interaction between functional groups of polymerization initiators and silica is generally weak, the balance of the low heat build-up property, wet grip performance and abrasion resistance, and the balance of the low heat build-up property and breaking properties of this polymer should be poor, compared to the present invention. In addition, functional groups of polymerization initiators are likely to be released, and thus contribute to an increase in energy loss, leading to more heat build-up. Further, in the case of using a polymerization initiator having a functional group with high polarity, the functional group is coordinated with a living polymer end and therefore affects the reaction between the end of the polymer and the modifying agent. In other words, in this case, a desired functional group cannot be introduced to the end of the polymer. In contrast, in the present invention, since the compound (C) is used as a polymerization initiator, the polymer chain grows in two directions by the polymerization reaction, that is, has two living polymer ends so that functional groups of any modifying agent can be introduced into the ends. Therefore, the rubber composition of the present invention is excellent in the balance of the low heat build-up property, wet grip performance, and abrasion resistance, and also in the balance of the low heat build-up property and breaking properties.

In the present invention, the diene polymer is a modified diene polymer obtainable by reacting the compounds (A) and (B).

The compound (A) is an active alkali metal-terminated conjugated diene polymer obtainable by polymerizing a conjugated diene monomer alone or with an aromatic vinyl monomer, in the presence of the compound (C). It should be noted that the active conjugated diene polymer has two ends terminated with an alkali metal.

The compound (C) is a chemical species obtainable by reacting an organic alkali metal compound with a compound represented by the following formula (1).

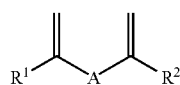

(1)

(In the formula (1), $R^1$ and $R^2$ are the same as or different from each other and each represents a hydrogen atom, a branched or unbranched alkyl group, an aryl group, a branched or unbranched alkoxy group, a branched or unbranched silyloxy group, a branched or unbranched acetal group, a carboxyl group (—COOH), a mercapto group (—SH), or a derivative thereof; and A represents a branched or unbranched alkylene group, an arylene group, or a derivative thereof.)

Examples of branched or unbranched alkyl groups for $R^1$ and $R^2$ include $C_{1-30}$ alkyl groups (preferably $C_{1-8}$, more preferably $C_{1-4}$, further more preferably $C_{1-2}$ alkyl groups) such as methyl group, ethyl group, n-propyl group, isopropyl group, n-butyl group, iso-butyl group, sec-butyl group, tert-butyl group, pentyl group, hexyl group, heptyl group, 2-ethylhexyl group, octyl group, nonyl group, and decyl group. Examples of the alkyl groups further include alkyl groups whose hydrogen atom(s) is (are) substituted with aryl group(s) (e.g. phenyl group).

Examples of aryl groups for $R^1$ and $R^2$ include $C_{6-18}$ aryl groups (preferably $C_{6-8}$ aryl groups) such as phenyl group, tolyl group, xylyl group, naphthyl group, and biphenyl group. Examples of the aryl groups further include aryl groups whose hydrogen atom(s) is (are) substituted with alkyl group(s) (e.g. methyl group).

Examples of branched or unbranched alkoxy groups for $R^1$ and $R^2$ include $C_{1-8}$ alkoxy groups (preferably $C_{1-6}$, more preferably $C_{1-4}$ alkoxy groups) such as methoxy group, ethoxy group, n-propoxy group, isopropoxy group, n-butoxy group, and t-butoxy group. Other examples of the alkoxy groups include cycloalkoxy groups ($C_{5-8}$ cycloalkoxy groups such as cyclohexyloxy group) and aryloxy groups ($C_{6-8}$ aryloxy groups such as phenoxy group and benzyloxy group).

Examples of branched or unbranched silyloxy groups for $R^1$ and $R^2$ include silyloxy groups substituted with a $C_{1-20}$ aliphatic or aromatic group (e.g. trimethylsilyloxy group, triethylsilyloxy group, triisopropylsilyloxy group, diethylisopropylsilyloxy group t-butyldimethylsilyloxy group, t-butyldiphenylsilyloxy group, tribenzylsilyloxy group, triphenylsilyloxy group, and tri-p-xylylsilyloxy group).

Examples of branched or unbranched acetal groups for $R^1$ and $R^2$ include groups represented by the formulae: —C(RR')—OR" and —O—C(RR')—OR". Examples of groups represented by the former formula include methoxymethyl group, ethoxymethyl group, propoxymethyl group, butoxymethyl group, isopropoxymethyl group, t-butoxymethyl group, and neopentyloxymethyl group. Examples of groups represented by the latter formula include methoxymethoxy group, ethoxymethoxy group, propoxymethoxy group, i-propoxymethoxy group, n-butoxymethoxy group, t-butoxymethoxy group, n-pentyloxymethoxy group, n-hexyloxymethoxy group, cyclopenthyloxymethoxy group, and cyclohexyloxymethoxy group.

$R^1$ and $R^2$ each are preferably a hydrogen atom, a branched or unbranched alkyl group, or an aryl group. With this structure, the balance of the low heat build-up property, wet grip performance and abrasion resistance, and the balance of the low heat build-up property and breaking properties can be improved. $R^1$ and $R^2$ are preferably the same because the polymer equally grows in two directions.

Examples of branched or unbranched alkylene groups for A include $C_{1-30}$ alkylene groups (preferably $C_{1-8}$, more preferably $C_{1-4}$ alkylene groups) such as methylene group, ethylene group, propylene group, butylene group, pentylene group, hexylene group, heptylene group, octylene group, nonylene group, decylene group, undecylene group, dodecylene group, tridecylene group, tetradecylene group, pentadecylene group, hexadecylene group, heptadecylene group, and octadecylene group.

Examples of derivatives of the above alkylene groups for A include alkylene groups substituted with an aryl or arylene group.

Examples of arylene groups for A include phenylene group, tolylene group, xylylene group, and naphthylene group.

Examples of derivatives of the above arylene groups for A include arylene groups substituted with an alkylene group.

A is preferably an arylene group and is more preferably a phenylene group (i.e. compounds represented by the following formula (2)). With this structure, the balance of the low heat build-up property, wet grip performance and abrasion resistance, and the balance of the low heat build-up property and breaking properties can be improved.

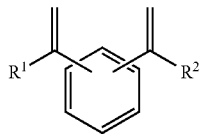
(2)

$R^1$ and $R^2$ in the formula (2) are defined as in the formula (1).

Specific examples of compounds represented by the formula (1) or (2) include 1,2-divinylbenzene, 1,3-divinylbenzene, 1,4-divinylbenzene, 1,2-diisopropenylbenzene, 1,3-diisopropenylbenzene, 1,4-diisopropenylbenzene, 1,2-diisobutenyl benzene, 1,3-diisobutenyl benzene, 1,4-diisobutenyl benzene, 1,3-phenylenebis(1-vinyl benzene), 1,4-phenylenebis(1-vinyl benzene), 1,1'-methylenebis(2-vinyl benzene), 1,1'-methylenebis(3-vinyl benzene), and 1,1'-methylenebis(4-vinyl benzene). Any of these may be used alone, or two or more of these may be used in combination. Among these, 1,3-divinylbenzene, 1,3-diisopropenylbenzene, and 1,3-phenylenebis(1-vinyl benzene) are preferable.

Examples of the organic alkali metal compound used in the present invention include hydrocarbon compounds containing an alkali metal such as lithium, sodium, potassium, rubidium, or cesium. Among these, lithium- or sodium-containing compounds having 2 to 20 carbon atoms are preferable. Specific examples thereof include ethyl lithium, n-propyl lithium, iso-propyl lithium, n-butyl lithium, sec-butyl lithium, t-octyl lithium, n-decyl lithium, phenyl lithium, 2-naphthyl lithium, 2-butyl-phenyl lithium, 4-phenyl-butyl lithium, cyclohexyl lithium, 4-cyclopentyl lithium, and 1,4-dilithio-butene-2. Among these, n-butyl lithium and sec-butyl lithium are preferable because they allow the reaction to proceed rapidly and provide a polymer with a narrow molecular weight distribution.

The method for preparing the compound (C) is not particularly limited, provided that the compound represented by the formula (1) and the organic alkali metal compound are brought into contact. Specifically, the compound (C) can be prepared by dissolving the compound represented by the formula (1) and the organic alkali metal compound separately in an organic solvent, which is inert to the reaction, such as a hydrocarbon solvent; and adding dropwise the solution of the organic alkali metal compound to the solution of the compound represented by the formula (1) with stirring. The reaction temperature for preparing the compound (C) is preferably 40° C. to 60° C.

The hydrocarbon solvent is a solvent that does not deactivate the above organic alkali metal compound (alkali metal catalyst), and suitable examples of the hydrocarbon solvent include aliphatic hydrocarbons, aromatic hydrocarbons, and alicyclic hydrocarbons. Specific examples thereof include those with 2 to 12 carbon atoms such as propane, n-butane, iso-butane, n-pentane, iso-pentane, n-hexane, cyclohexane, propene, 1-butene, iso-butene, trans-2-butene, cis-2-butene, 1-pentene, 2-pentene, 1-hexene, 2-hexene, benzene, toluene, xylene, and ethyl benzene. Any of these solvents may be used alone, or two or more of these may be used in admixture.

Examples of the conjugated diene monomer used in the present invention include 1,3-butadiene, isoprene, 1,3-pentadiene (piperylene), 2,3-dimethyl-1,3-butadiene, and 1,3-hexadiene. Considering the physical properties of the resulting polymer and the availability for industrial purposes, 1,3-butadiene and isoprene are preferable among these.

Examples of the aromatic vinyl monomer used in the present invention include styrene, α-methylstyrene, vinyltoluene, vinylnaphthalene, divinylbenzene, trivinylbenzene, and divinylnaphthalene. Considering the physical properties of the resulting polymer and the availability for industrial purposes, styrene is preferable among these.

As the monomer(s), the conjugated diene monomer may be used alone, or alternatively, the conjugated diene monomer and the aromatic vinyl monomer may be used in combination. When the conjugated diene monomer and the aromatic vinyl monomer are used in combination, the ratio of these monomers (conjugated diene monomer/aromatic vinyl monomer) is preferably 50/50 to 90/10, and is more preferably 55/45 to 85/15 on a mass basis. If the ratio is less than 50/50, the polymer rubber may be insoluble in a hydrocarbon solvent. In such a case, uniform polymerization may be impossible. On the other hand, if the ratio is more than 90/10, the strength of the polymer rubber may be lowered.

When the tire rubber composition of the present invention is used as a rubber composition for a tread (cap tread), the modified diene polymer is preferably a copolymer obtainable by copolymerizing the conjugated diene monomer and the aromatic vinyl monomer, and particularly preferably a copolymer obtainable by copolymerizing 1,3-butadiene and styrene (modified styrene-butadiene rubber). The use of such a modified copolymer improves the balance of the low heat build-up property, wet grip performance and abrasion resistance.

When the tire rubber composition of the present invention is used as a rubber composition for a base tread or a sidewall, the modified diene polymer is preferably a polymer obtainable by polymerizing the conjugated diene monomer, and particularly preferably a polymer obtainable by homopolymerization of 1,3-butadiene (modified butadiene rubber). The use of such a modified polymer improves the balance of the low heat build-up property and breaking properties.

The method for preparing the compound (A) is not particularly limited, provided that the compound (C) is used as a polymerization initiator. Conventionally known methods may be employed. Specifically, in an organic solvent, which is inert to the reaction, such as a hydrocarbon solvent, the conjugated diene monomer, of the conjugated diene monomer and the aromatic vinyl monomer is/are polymerized using the compound (C) as a polymerization initiator, optionally in presence of a randomizer. Then, the target active conjugated diene polymer with both ends terminated with an alkali metal is prepared.

As the hydrocarbon solvent, those used for preparation of the compound (C) can be suitably used.

The randomizer means a compound having a function of controlling the microstructure of conjugated diene portion in a polymer, for example, increase of 1,2-bond in butadiene portion or increase of 3,4-bond in isoprene portion, or a function of controlling the compositional distribution of each monomer units in a polymer, for example, randomization of butadiene unit and styrene unit in a butadiene-styrene copolymer.

As the randomizer, compounds of various types can be used. Considering the availability for industrial purposes, ethers and tertiary amines are preferable among these. Examples of the ethers include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of the tertiary amines include triethylamine, tripropylamine, and tributylamine. Other examples thereof include N,N,N',N'-tetramethylethylenediamine, N,N-diethylaniline, pyridine, and quinoline.

The compound (B) is a modifying agent having a functional group. The compound (B) is preferably a compound having a functional group that contains at least one atom selected from the group consisting of nitrogen, oxygen, and silicon.

Examples of the functional group include amino group, amide group, alkoxysilyl group, isocyanate group, imino group, imidazole group, urea group, ether group (in particular, epoxy group), carbonyl group, carboxyl group, hydroxyl group, nitrile group, pyridyl group, and diglycidylamino group. These functional groups may be substituted. Among these, amino group, alkoxysilyl group, ether group (in particular, epoxy group), carbonyl group, hydroxyl group, carboxyl group, and diglycidylamino group are preferable because they are highly reactive with silica.

The compound (B) is preferably a compound represented by the following formula (3). It is preferable that the compound (B) is a single compound (that is, the same modifying agent is introduced into both ends of the compound (A)). When the compound (B) is a single compound, the functional groups introduced into both ends of the compound (A) are the same. In other words, the polymer has uniform ends, and therefore the reactivity of the polymer with silica is stable.

The compound represented by the following formula (3) is a polyfunctional compound having two or more epoxy groups. These epoxy groups react with the active ends of the active conjugated diene polymer (A). As a result of the reaction, hydroxyl groups can be introduced into the polymer chain. Since the polyfunctional compound has two or more epoxy groups in a single molecule, one molecule of the polyfunctional compound will react with active ends of multiple molecules of the active conjugated diene polymer (A). In this case, two or more polymer chains may be coupled. Thus, the resulting modified diene polymer should include a polymer having three or more moieties (e.g. ends) modified with the polyfunctional compound. Thus, the balance of the low heat build-up property, wet grip performance and abrasion resistance, and the balance of the low heat build-up property and breaking properties can be improved by an increase in the number of modified moieties (e.g. modified ends) of the modified diene polymer.

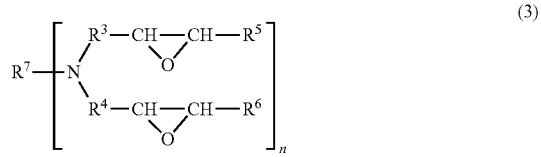

(In the formula (3), $R^3$ and $R^4$ are the same as or different from each other and each represents a $C_{1-10}$ hydrocarbon group, and the hydrocarbon group may have at least one selected from the group consisting of an ether group and a tertiary amine group; $R^5$ and $R^6$ are the same as or different from each other and each represents a hydrogen atom or a $C_{1-20}$ hydrocarbon group, and the hydrocarbon group may have at least one selected from the group consisting of an ether group and a tertiary amine group; $R^7$ represents a $C_{1-20}$ hydrocarbon group, and the hydrocarbon group may have at least one selected from the group consisting of an ether group, a tertiary amine group, an epoxy group, a carbonyl group, and a halogen; and n is an integer of 1 to 6.)

$R^3$ and $R^4$ each are preferably a $C_{1-10}$ (preferably $C_{1-3}$) alkylene group. $R^5$ and $R^6$ each are preferably a hydrogen atom. Examples of $R^7$ include $C_{3-20}$ hydrocarbon groups (preferably $C_{6-10}$, more preferably $C_8$ hydrocarbon groups), and preferable examples thereof include cycloalkyl groups and cycloalkylene groups such as those represented by the following formulae. Cycloalkylene groups are more preferable.

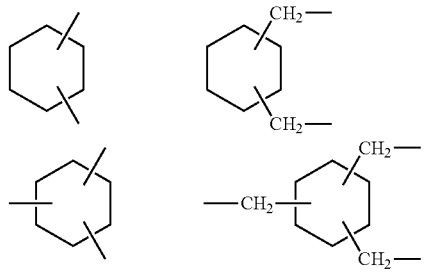

Preferably, n is 2 or 3. Suitable examples of the compound represented by the formula (3) include tetraglycidyl metaxylenediamine, tetraglycidyl aminodiphenylmethane, tetraglycidyl-p-phenylenediamine, diglycidyl aminomethylcyclohexane, and tetraglycidyl-1,3-bisaminomethylcyclohexane.

In the present invention, the diene polymer (modified diene polymer) can be produced by reacting the compounds (A) and (B) in an organic solvent inert to the reaction, such as a hydrocarbon solvent.

As the hydrocarbon solvent, those used for preparation of the compound (C) can be suitably used.

The amount of the modifying agent (B) having a functional group is preferably 0.1 to 10 mol, and more preferably 0.5 to 2 mol, per 1 mol of the organic alkali metal compound. Use of less than 0.1 mol of the modifying agent (B) provides little improvement in fuel economy. On the other hand, use of more than 10 mol of the modifying agent (B) may leave an unreacted portion thereof in the polymerization solvent and therefore is not preferable for economical reasons because, for example, for recycle of the solvent, an operation for removing the remaining portion of the modifying agent (B) from the solvent is necessary.

Since the reaction between the compounds (A) and (B) rapidly proceeds, the reaction temperature and the reaction time can be selected from wide ranges. Generally, the reaction temperature is from room temperature (25° C.) to 80° C. and the reaction time is from few seconds to several hours. Any method may be employed for the reaction as long as the compounds (A) and (B) are brought into contact. In one non-limiting suitable method for the reaction, for example, the diene polymer is formed by polymerization using the compound (C), and a predetermined amount of the compound (B) is then added to the polymer solution.

In terms of kneadability, a coupling agent represented by the general formula $R_aMX_b$ may be added before or after the reaction between the compounds (A) and (B) (in the formula, R represents an alkyl group, an alkenyl group, a cycloalkenyl group or an aromatic hydrocarbon group; M represents a silicon or tin atom; X represents a halogen atom; "a" represents an integer of 0 to 2; and b represents an integer of 2 to 4). The amount of the coupling agent is preferably 0.03 to 0.4 mol, and more preferably 0.05 to 0.3 mol, per 1 mol of the used organic alkali metal compound (alkali metal catalyst). Use of less than 0.03 mol of the coupling agent provides little improvement in processability. On the other hand, use of more than 0.4 mol of the coupling agent reduces alkali metal ends that may react with the modifying agent having a functional group, and thus provides less improvement in fuel economy.

After completion of the reaction, the modified diene polymer can be solidified by a solidifying technique used in the production of rubber by common solution polymerization, such as addition of a coagulant or steam coagulation, and then can be separated from the reaction solvent. The solidifying temperature is not limited at all.

The solidified mass separated from the reaction solvent is dried, and thus the diene polymer (modified diene polymer) can be obtained. For drying the solidified mass, common driers used in production of synthetic rubber such as a band drier, an extrusion drier, or the like can be used. The drying temperature is not limited at all.

The Mooney viscosity ($ML_{1+4}$) (100° C.) of the diene polymer is preferably 10 to 200, and more preferably 20 to 150. The upper limit thereof is further more preferably not more than 100, and particularly preferably not more than 75. If the Mooney viscosity is less than 10, the mechanical properties (e.g. tensile strength) of the rubber composition after vulcanization may be lowered. If the viscosity is more than 200, the diene polymer, when used with other rubbers, may have poor compatibility. In such a case, processability may be deteriorated, and thus the mechanical properties of the resulting rubber composition after vulcanization may be lowered.

In the tire rubber composition of the present invention, the vinyl content of the conjugated diene moiety of the diene polymer is not particularly limited and is preferably, for example, 5 to 80 mol %.

For use of the rubber composition as a rubber composition for a tread (cap tread), the vinyl content is preferably 10 to 70 mol %, and more preferably 15 to 60 mol %. The lower limit thereof is further more preferably not less than 35 mol %, particularly preferably not less than 40 mol %, and most preferably not less than 50 mol %. If the vinyl content is less than 10 mol %, the glass transition temperature of the polymer may be very low, so that when the polymer is used for tires, grip performance (wet grip performance) may be poor. On the other hand, if the vinyl content is more than 70 mol %, the glass transition temperature of the polymer may be increased, possibly resulting in poor impact resilience.

For use of the rubber composition as a rubber composition for a base tread or a sidewall, the vinyl content of the conjugated diene moiety of the diene polymer is preferably not more than 50 mol %, more preferably not more than 40 mol %, and further more preferably not more than 30 mol %. If the vinyl content is more than 50 mol %, the low heat build-up property tends to be poor. The lower limit thereof is not particularly limited, and is preferably not less than 5 mol %, and more preferably not less than 10 mol %.

In the present invention, the vinyl content (1,2-butadiene unit content) may be determined by infrared absorption spectrum analysis.

In the tire rubber composition of the present invention, the amount of the diene polymer in 100% by mass of the rubber component is not particularly limited and is preferably, for example, not less than 5% by mass.

For use of the rubber composition as a rubber composition for a tread (cap tread), the amount of the diene polymer in 100% by mass of the rubber component is preferably not less than 5% by mass, more preferably not less than 10% by mass, further more preferably not less than 40% by mass, and particularly preferably not less than 60% by mass. If the amount is less than 5% by mass, the low heat build-up property, wet grip performance, and abrasion resistance may not be at sufficient levels. The amount of the diene polymer may be 100% by mass, and is preferably not more than 90% by mass, and more preferably not more than 80% by mass.

For use of the rubber composition as a rubber composition for a base tread, the amount of the diene polymer in 100% by mass of the rubber component is preferably not less than 5% by mass, more preferably not less than 10% by mass, and further more preferably not less than 20% by mass. The amount of the diene polymer is preferably not more than 60% by mass, more preferably not more than 50% by mass, and further more preferably not more than 40% by mass. By using the diene polymer in an amount within such a range, the balance of the low heat build-up property and breaking properties can be improved.

For use of the rubber composition as a rubber composition for a sidewall, the amount of the diene polymer in 100% by mass of the rubber component is preferably not less than 30% by mass, more preferably not less than 40% by mass, and further more preferably not less than 50% by mass. The amount of the diene polymer is preferably not more than 90% by mass, more preferably not more than 80% by mass, and further more preferably not more than 70% by mass. By using the diene polymer in an amount within such a range, the balance of the low heat build-up property and breaking properties can be improved.

Examples of rubbers other than the diene polymer which may be contained in the rubber component include natural rubber (NR), butadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR). Any of these rubbers may be used alone, or two or more of these may be used in combination. Among these, NR and BR are preferable because of their high performance of improving rubber strength and crack growth resistance.

The NR is not particularly limited, and examples thereof include those commonly used in the tire industry such as SIR20, RSS#3, TSR20, deproteinized natural rubber (DPNR), and highly purified natural rubber (HPNR).

When the rubber composition of the present invention is used as a rubber composition for a tread (cap tread) with NR mixed therein, the amount of NR in 100% by mass of the rubber component is preferably not less than 5% by mass, and more preferably not less than 10% by mass. If the amount is less than 5% by mass, the rubber strength may be insufficient. The amount of NR is preferably not more than 40% by mass, and more preferably not more than 30% by mass. If the amount is more than 40% by mass, grip performance (wet grip performance) may be lowered.

For use of the rubber composition as a rubber composition for a base tread, the amount of NR in 100% by mass of the rubber component is preferably not less than 40% by mass, more preferably not less than 50% by mass, and further more preferably not less than 60% by mass. The amount of NR is preferably not more than 90% by mass, and more preferably not more than 80% by mass. By using NR in an amount within such a range, the balance of the low heat build-up property and breaking properties can be improved.

For use of the rubber composition as a rubber composition for a sidewall, the amount of NR in 100% by mass of the rubber component is preferably not less than 10% by mass, and more preferably not less than 20% by mass. The amount of NR is preferably not more than 60% by mass, more preferably not more than 50% by mass, and further more preferably not more than 40% by mass. By using NR in an amount within such a range, the balance of the low heat build-up property and breaking properties can be improved.

The BR is not particularly limited and examples thereof include BRs with a high cis content such as BR1220 and BR1250H (ZEON Corporation), and BR130B and BR150B (Ube Industries, Ltd.); syndiotactic polybutadiene crystal-containing BRs such as VCR412 and VCR617 (Ube Industries, Ltd.); and BRs produced by polymerization with use of Nd (neodymium) catalysts such as CB22 and CB24 (LANXESS). BRs with a cis content of not less than 95% by mass are preferable among these because of their low glass transition temperature (Tg).

When the rubber composition of the present invention is used as a rubber composition for a tread (cap tread) with BR mixed therein, the amount of BR in 100% by mass of the rubber component is preferably not less than 5% by mass, and more preferably not less than 10% by mass. If the amount is less than 5% by mass, crack growth resistance may be decreased. The amount of BR is preferably not more than 30% by mass, and more preferably not more than 20% by mass. If the amount is more than 30% by mass, grip performance (wet grip performance) may be deteriorated.

In the present invention, silica is used. The use of silica together with the diene polymer leads to very low heat build-up and high rubber strength. The silica is not particularly limited and examples thereof include dry silica (silicic anhydride) and wet silica (hydrous silicic acid). Wet silica is preferable because it has more silanol groups.

The nitrogen adsorption specific surface area ($N_2SA$) of the silica is preferably not less than 40 $m^2/g$, more preferably not less than 50 $m^2/g$, further more preferably not less than 100 $m^2/g$, and particularly preferably not less than 150 $m^2/g$. If the $N_2SA$ is less than 40 $m^2/g$, tensile strength tends to be lowered. The $N_2SA$ of the silica is preferably not more than 250 $m^2/g$, more preferably not more than 220 $m^2/g$, and further more preferably not more than 200 $m^2/g$. If the $N_2SA$ is more than 250 $m^2/g$, the low heat build-up property and processability of the rubber composition tend to be lowered.

The nitrogen adsorption specific surface area of the silica is determined by the BET method in accordance with ASTM D3037-81.

The amount of silica in the rubber composition of the present invention is not particularly limited, and is preferably, for example, 5 to 150 parts by mass.

For use of the rubber composition as a rubber composition for a tread (cap tread), the amount of silica is preferably not less than 10 parts by mass, more preferably not less than 20 parts by mass, and further more preferably not less than 30 parts by mass, per 100 parts by mass of the rubber component. If the amount is less than 10 parts by mass, the effects produced by blending silica tend not to be sufficiently exerted. The amount of silica is preferably not more than 150 parts by mass, more preferably not more than 120 parts by mass, and further more preferably not more than 100 parts by mass, per 100 parts by mass of the rubber component. If the amount is more than 150 parts by mass, the silica may not be easily dispersed in the rubber composition, and thus processability of the rubber composition tends to be deteriorated.

For use of the rubber composition as a rubber composition for a base tread or a sidewall, the amount of silica is preferably not less than 15 parts by mass, more preferably not less than 25 parts by mass, and further more preferably not less than 35 parts by mass, per 100 parts by mass of the rubber component. The amount of silica is preferably not more than 120 parts by mass, more preferably not more than 90 parts by mass, and further more preferably not more than 60 parts by mass, per 100 parts by mass of the rubber component. By using silica in an amount within such a range, the balance of the low heat build-up property and breaking properties can be improved.

In the present invention, the silica is preferably used with a silane coupling agent. Examples of the silane coupling agent include sulfide-type silane coupling agents, mercapto-type silane coupling agents, vinyl-type silane coupling agents, amino-type silane coupling agents, glycidoxy-type silane coupling agents, nitro-type silane coupling agents, and chloro-type silane coupling agents. Sulfide-type silane coupling agents and mercapto-type silane coupling agents are preferable among these, and mercapto-type silane coupling agents are particularly preferable.

As the sulfide-type silane coupling agents, bis(3-triethoxysilylpropyl)tetrasulfide, bis(2-triethoxysilylethyl)tetrasulfide, bis(3-triethoxysilylpropyl)disulfide, and bis(2-triethoxysilylethyl)disulfide are preferable, and bis(3-triethoxysilylpropyl)disulfide is more preferable because they provide excellent breaking energy (rubber strength).

The tire rubber composition of the present invention preferably contains, as mercapto-type silane coupling agent, a silane coupling agent represented by the following formula (4) and/or a silane coupling agent that is a copolymer comprising units A represented by the following formula (5) and units B represented by the following formula (6), wherein the proportion of the units B is 1 to 70 mol % of the total molar amount of the units A and the units B.

The use of the silane coupling agent represented by the formula (4) further improves fuel economy and wet grip performance compared to the use of sulfide-type silane coupling agents used in conventional tire rubber compositions, such as bis(3-triethoxysilylpropyl)tetrasulfide.

In particular, combination use of the modified diene polymer according to the present invention, silica, and the silane coupling agent represented by the following formula (4) synergistically improves the above performances.

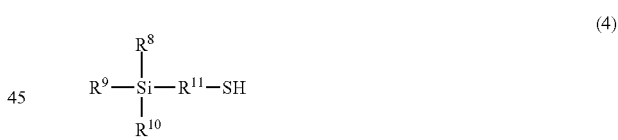

(4)

In the formula (4), $R^8$ represents a group represented by the formula: $-O-(R^{12}-O)_m-R^{13}$, m $R^{12}$s may be the same as or different from each other and each represents a branched or unbranched $C_{1-30}$ divalent hydrocarbon group, and $R^{13}$ represents a branched or unbranched $C_{1-30}$ alkyl group, a branched or unbranched $C_{2-30}$ alkenyl group, a $C_{6-30}$ aryl group, or a $C_{7-30}$ aralkyl group, and m is an integer of 1 to 30.

$R^{12}$s are the same as or different from each other and each represents a branched or unbranched $C_{1-30}$ (preferably $C_{1-10}$ more preferably $C_{1-3}$) divalent hydrocarbon group.

Examples of the hydrocarbon group include branched or unbranched $C_{1-30}$ alkylene groups, branched or unbranched $C_{2-30}$ alkenylene groups, branched or unbranched $C_{2-30}$ alkynylene groups, and $C_{6-30}$ arylene groups. The alkylene groups are preferable among these.

Examples of the branched or unbranched $C_{1-30}$ (preferably $C_{1-10}$, more preferably $C_{1-3}$) alkylene groups for $R^{12}$s include: methylene group, ethylene group, propylene group, butylene group, pentylene group, hexylene group, heptylene group, octylene group, nonylene group, decylene group, undecylene group, dodecylene group, tridecylene group, tetradecylene group, pentadecylene group, hexadecylene group, heptadecylene group, and octadecylene group.

Examples of the branched or unbranched $C_{2-30}$ (preferably $C_{2-10}$, more preferably $C_{2-5}$) alkenylene groups for $R^{12}$s include: vinylene group, 1-propenylene group, 2-propenylene group, 1-butenylene group, 2-butenylene group, 1-pentenylene group, 2-pentenylene group, 1-hexenylene group, 2-hexenylene group, and 1-octenylene group.

Examples of the branched or unbranched $C_{2-30}$ (preferably $C_{2-10}$, more preferably $C_{2-5}$) alkynylene groups for $R^{12}$s include: ethynylene group, propynylene group, butynylene group, pentynylene group, hexynylene group, heptynylene group, octynylene group, nonynylene group, decynylene group, undecynylene group, and dodecynylene group.

Examples of the $C_{6-30}$ (preferably $C_{6-10}$) arylene groups for $R^{12}$s include phenylene group, tolylene group, xylylene group, and naphthylene group.

"m" is an integer of 1 to 30 (preferably an integer of 2 to 10, more preferably an integer of 3 to 7, and further more preferably an integer of 5 or 6). When m is 0, the silane coupling agent is less likely to get closer to silica, so that the reaction between the silane coupling agent and silica is less likely to occur. When m is 31 or more, the molecules tend to aggregate, so that the silane coupling agent becomes less likely to get closer to silica. As a result, the reaction between the silane coupling agent and silica is less likely to occur.

$R^{13}$ represents a branched or unbranched $C_{1-30}$ alkyl group, a branched or unbranched $C_{2-30}$ alkenyl group, a $C_{6-30}$ aryl group, or a $C_{7-30}$ aralkyl group. In particular, $R^{13}$ is preferably a branched or unbranched $C_{1-30}$ alkyl group because of its lower steric hindrance.

Examples of branched or unbranched $C_{1-30}$ (preferably $C_{5-25}$, more preferably $C_{10-15}$) alkyl groups for $R^{13}$ include: methyl group, ethyl group, n-propyl group, isopropyl group, n-butyl group, iso-butyl group, sec-butyl group, tert-butyl group, pentyl group, hexyl group, heptyl group, 2-ethylhexyl group, octyl group, nonyl group, decyl group, undecyl group, dodecyl group, tridecyl group, tetradecyl group, pentadecyl group, and octadecyl group.

Examples of branched or unbranched $C_{2-30}$ (preferably $C_{5-25}$, more preferably $C_{10-15}$) alkenyl groups for $R^{13}$ include: vinyl group, 1-propenyl group, 2-propenyl group, 1-butenyl group, 2-butenyl group, 1-pentenyl group, 2-pentenyl group, 1-hexenyl group, 2-hexenyl group, 1-octenyl group, decenyl group, undecenyl group, dodecenyl group, tridecenyl group, tetradecenyl group, pentadecenyl group, and octadecenyl group.

Examples of $C_{6-30}$ (preferably $C_{10-25}$) aryl groups for $R^{13}$ include Phenyl group, tolyl group, xylyl group, naphthyl group, and biphenyl group.

Examples of $C_{7-30}$ (preferably $C_{10-25}$) aralkyl groups for $R^{13}$ include benzyl group and phenethyl group.

Specific examples of $R^8$ in the formula (4) include: —O—$(C_2H_4$—O$)_5C_{11}H_{23}$, —O—$(C_2H_4$—O$)_5$—$C_{12}H_{25}$, —O—$(C_2H_4$—O$)_5$—$C_{13}H_{27}$, —O—$(C_2H_4$—O$)_5$—$C_{14}H_{29}$, —O—$(C_2H_4$—O$)_5$—$C_{15}H_{31}$, —O—$(C_2H_4$—O$)_3$—$C_{13}H_{27}$, —O—$(C_2H_4$—O$)_4$—$C_{13}H_{27}$, —O—$(C_2H_4$—O$)_6$—$C_{13}H_{27}$, —O—$(C_2H_4$—O$)_7$—$C_{13}H_{27}$. Among these, —O—$(C_2H_4$—O$)_5$—$C_{11}H_{23}$, —O—$(C_2H_4$—O$)_5$—$C_{13}H_{27}$, —O—$(C_2H_4$—O$)_5$—$C_{15}H_{31}$, and —O—$(C_2H_4$—O$)_6$—$C_{13}H_{27}$ are preferable.

$R^9$ and $R^{10}$ are the same as or different from each other and each represents the same group as $R^8$ (i.e. a group represented by the formula: —O—$(R^{12}$—O$)_m$—$R^{13}$) or a branched or unbranched $C_{1-12}$ alkyl group or a group represented by the formula —O—$R^{14}$ ($R^{14}$ represents a hydrogen atom, a branched or unbranched $C_{1-30}$ alkyl group, a branched or unbranched $C_{2-30}$ alkenyl group, a $C_{6-30}$ aryl group, or a $C_{7-30}$ aralkyl group). For a higher probability of contacts with silica, $R^9$ and $R^{10}$ each are preferably the same group as $R^8$, or a group represented by the formula —O—$R^{14}$ ($R^{14}$ represents a branched or unbranched $C_{1-30}$ alkyl group).

Examples of branched or unbranched $C_{1-12}$ alkyl groups for $R^9$ and $R^{10}$ include: methyl group, ethyl group, n-propyl group, isopropyl group, n-butyl group, iso-butyl group, sec-butyl group, tert-butyl group, pentyl group, hexyl group, heptyl group, 2-ethylhexyl group, octyl group, and nonyl group.

Examples of branched or unbranched $C_{1-30}$ (preferably $C_{1-10}$, more preferably $C_{1-3}$) alkyl groups for $R^{14}$ include those listed above for the branched or unbranched $C_{1-30}$ alkyl groups for $R^{13}$.

Examples of branched or unbranched $C_{2-30}$ alkenyl groups for $R^{14}$ include those listed above for the branched or unbranched $C_{2-30}$ alkenyl groups for $R^{13}$.

Examples of $C_{6-30}$ aryl groups for $R^{14}$ include those listed above for the $C_{6-30}$ aryl groups for $R^{13}$.

Examples of $C_{7-30}$ aralkyl groups for $R^{14}$ include those listed above for the $C_{7-30}$ aralkyl groups for $R^{13}$.

Specific examples of $R^9$ and $R^{10}$ in the formula (4) include: —O—$(C_2H_4$—O$)_5$—$C_{11}H_{23}$, —O—$(C_2H_4$—O$)_5$—$C_{12}H_{25}$, —O—$(C_2H_4$—O$)_5$—$C_{13}H_{27}$, —O—$(C_2H_4$—O$)_5$—$C_{14}H_{29}$, —O—$(C_2H_4$—O$)_5$—$C_{15}H_{31}$, —O—$(C_2H_4$—O$)_3$—$C_{13}H_{27}$, —O—$(C_2H_4$—O$)_4$—$C_{13}H_{27}$, —O—$(C_2H_4$—O$)_6$—$C_{13}H_{27}$, —O—$(C_2H_4$—O$)_7$—$C_{13}H_{27}$, $C_2H_5$—O—, $CH_3$—O—, and $C_3H_7$—O—. Among these, —O—$(C_2H_4$—O$)_5$—$C_{11}H_{23}$, —O—$(C_2H_4$—O$)_5$—$C_{13}H_{27}$, —O—$(C_2H_4$—O$)_5$—$C_{15}H_{31}$, —O—$(C_2H_4$—O$)_6$—$C_{13}H_{27}$, and $C_2H_5$—O— are preferable.

Examples of branched or unbranched $C_{1-30}$ (preferably $C_{1-10}$, more preferably $C_{1-5}$) alkylene groups for $R^{11}$ include those listed above for the branched or unbranched $C_{1-30}$ alkylene groups for $R^{12}$.

Examples of the silane coupling agent represented by the formula (4) include Si363 (Evonik Degussa). Such silane coupling agents may be used alone, or two or more of these may be used in combination.

The use of the silane coupling agent that is a copolymer comprising units A represented by the following formula (5) and units B represented by the following formula (6), wherein the proportion of the units B is 1 to 70 mol % of the total molar amount of the units A and the units B, improves the balance of fuel economy, wet grip performance and abrasion resistance, and the balance of the low-heat build-up property and breaking properties, compared to the use of sulfide-type silane coupling agents used in conventional tire rubber compositions such as bis(3-triethoxysilylpropyl)tetrasulfide. In particular, combination use of the modified diene polymer according to the present invention, silica, and the silane coupling agent that is a copolymer comprising units A represented by the following formula (5) and units B represented by the following formula (6), wherein the proportion of the units B is 1 to 70 mol % of the total molar amount of the units A and the units B, synergistically improves the above performances.

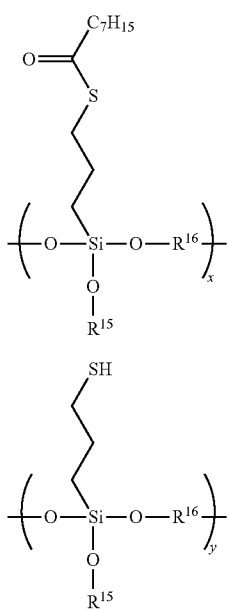

(In the formulae, x and y each represent an integer of 1 or larger; $R^{15}$ represents hydrogen, a halogen, or a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group obtained by replacing the end of the alkyl or alkenyl group with a hydroxy or carboxyl group; $R^{16}$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group; and $R^{15}$ and $R^{16}$ may form a ring together.)

In a silane coupling agent having the above structure, the molar ratio of the unit A and the unit B satisfies the aforementioned condition. Thus, such a silane coupling agent suppresses an increase in viscosity upon processing in comparison with polysulfide silanes such as bis-(3-triethoxysilylpropyl)tetrasulfide. This is presumably for the following reason. Since the sulfide portion of the unit A is a C—S—C bond, the sulfide portion is thermally stable compared with tetrasulfide or disulfide. Accordingly, the increase in Mooney viscosity will be small.

In the case that the molar ratio of the unit A and the unit B satisfies the condition, the silane coupling agent suppresses a reduction in scorch time in comparison with mercaptosilanes such as 3-mercaptopropyltrimethoxysilane. This is presumably for the following reason. The unit B has a mercaptosilane structure, and the —SH group of the unit B is covered with the —$C_7H_{15}$ portion of the unit A. Accordingly, the —SH group is less likely to react with polymers, so that scorch is less likely to occur. Thus, deterioration of abrasion resistance can be prevented, and the low heat build-up property, wet grip performance and abrasion resistance can therefore be improved in a balanced manner. Also, the balance of the low heat build-up property and breaking properties can be further improved.

Examples of halogens for $R^{15}$ include chlorine, bromine, and fluorine.

Examples of branched or unbranched $C_{1-30}$ alkyl groups for $R^{15}$ and $R^{16}$ include methyl group, ethyl group, n-propyl group, isopropyl group, n-butyl group, iso-butyl group, sec-butyl group, tert-butyl group, pentyl group, hexyl group, heptyl group, 2-ethylhexyl group, octyl group, nonyl group, and decyl group. The carbon number of the alkyl group is preferably 1 to 12.

Examples of branched or unbranched $C_{1-30}$ alkylene groups for $R^{15}$ and $R^{16}$ include ethylene group, propylene group, butylene group, pentylene group, hexylene group, heptylene group, octylene group, nonylene group, decylene group, undecylene group, dodecylene group, tridecylene group, tetradecylene group, pentadecylene group, hexadecylene group, heptadecylene group, and octadecylene group. The carbon number of the alkylene group is preferably 1 to 12.

Examples of branched or unbranched $C_{2-30}$ alkenyl groups for $R^{15}$ and $R^{16}$ include vinyl group, 1-propenyl group, 2-propenyl group, 1-butenyl group, 2-butenyl group, 1-pentenyl group, 2-pentenyl group, 1-hexenyl group, 2-hexenyl group, and 1-octenyl group. The carbon number of the alkenyl group is preferably 2 to 12.

Examples of branched or unbranched $C_{2-30}$ alkenylene groups for $R^{15}$ and $R^{16}$ include vinylene group, 1-propenylene group, 2-propenylene group, 1-butenylene group, 2-butenylene group, 1-pentenylene group, 2-pentenylene group, 1-hexenylene group, 2-hexenylene group, and 1-octenylene group. The carbon number of the alkenylene group is preferably 2 to 12.

Examples of branched or unbranched $C_{2-30}$ alkynyl groups for $R^{15}$ and $R^{16}$ include ethynyl group, propynyl group, butynyl group, pentynyl group, hexynyl group, heptynyl group, octynyl group, nonynyl group, decynyl group, undecynyl group, and dodecynyl group. The carbon number of the alkynyl group is preferably 2 to 12.

Examples of branched or unbranched $C_{2-30}$ alkynylene groups for $R^{15}$ and $R^{16}$ include ethynylene group, propynylene group, butynylene group, pentynylene group, hexynylene group, heptynylene group, octynylene group, nonynylene group, decynylene group, undecynylene group, and dodecynylene group. The carbon number of the alkynylene group is preferably 2 to 12.

Examples of silane coupling agents having the above structure include NXT-Z15, NXT-Z30, NXT-Z45, and NXT-Z60 (Momentive Performance Materials). Any of these may be used alone, or two or more of these may be used in combination.

The amount of the silane coupling agent represented by the formula (4) and/or the silane coupling agent comprising units A represented by the formula (5) and units B represented by the formula (6) is preferably not less than 1 part by mass, more preferably not less than 5 parts by mass, and further more preferably not less than 8 parts by mass, per 100 parts by mass of silica. If the amount is less than 1 part by mass, breaking properties tend to be remarkably lowered. The amount of the silane coupling agent(s) having the above structure(s) is preferably not more than 15 parts by mass, and more preferably not more than 10 parts by mass, per 100 parts by mass of silica. If the amount is more than 15 parts by mass, the effects produced by adding the silane coupling agent(s), such as increase in tensile strength and decrease in rolling resistance, tend not to be sufficiently exerted.

In the case that the silane coupling agent represented by the formula (4) and the silane coupling agent comprising units A represented by the formula (5) and units B represented by the formula (6) are used in combination, the amount means the total amount of these silane coupling agents.

In the present invention, in the case that another silane coupling agent such as a sulfide-type silane coupling agent is also used, the total amount of the added silane coupling agents is preferably within the above range.

The tire rubber composition of the present invention may contain carbon black. The carbon black improves rubber strength. Examples of the carbon black include GPF, HAF, ISAF, and SAF.

In the case of using carbon black, the nitrogen adsorption specific surface area ($N_2SA$) of the carbon black is preferably not less than 30 $m^2/g$, and more preferably not less than 70 $m^2/g$. If the $N_2SA$ is less than 30 $m^2/g$, sufficient reinforcement tends not to be provided. The $N_2SA$ of the carbon black is preferably not more than 250 $m^2/g$, and more preferably not more than 150 $m^2/g$. If the $N_2SA$ is more than 250 $m^2/g$, the viscosity of the rubber composition before vulcanization tends to be remarkably high, thereby resulting in a decrease in processability; or fuel economy tends to be deteriorated.

For use of the rubber composition as a rubber composition for a tread (cap tread), the $N_2SA$ of the carbon black is preferably not less than 70 $m^2/g$, more preferably not less than 100 $m^2/g$, and further more preferably not less than 105 $m^2/g$. The $N_2SA$ of the carbon black is preferably not more than 150 $m^2/g$, and more preferably not more than 130 $m^2/g$. The $N_2SA$ within such a range leads to balanced improvement in the low heat build-up property, wet grip performance, and abrasion resistance.

For use of the rubber composition as a rubber composition for a base tread or a sidewall, the $N_2SA$ of the carbon black is preferably not less than 30 $m^2/g$, and more preferably not less than 60 $m^2/g$. The $N_2SA$ of the carbon black is preferably not more than 90 $m^2/g$, and more preferably not more than 85 $m^2/g$. The $N_2SA$ within such a range leads to balanced improvement in the low heat build-up property and breaking properties.

The nitrogen adsorption specific surface area of the carbon black is determined by the method A in accordance with JIS K6217.

For use of the tire rubber composition of the present invention as a rubber composition for a tread (cap tread), the dibutyl phthalate (DBP) oil absorption of the carbon black is preferably not less than 70 ml/100 g, and more preferably not less than 90 ml/100 g. The DBP oil absorption of the carbon black is preferably not more than 160 ml/100 g, and more preferably not more than 117 ml/100 g. The DBP oil absorption within such a range leads to balanced improvement in the low heat build-up property, wet grip performance, and abrasion resistance.

For use of the tire rubber composition of the present invention as a rubber composition for a base tread or a sidewall, the DBP oil absorption of the carbon black is preferably not less than 70 ml/100 g, and more preferably not less than 90 ml/100 g. The DBP oil absorption of the carbon black is preferably not more than 150 ml/100 g, and more preferably not more than 110 ml/100 g. The DBP oil absorption within such a range leads to balanced improvement in the low heat build-up property and breaking properties.

The DBP oil absorption of the carbon black is determined in accordance with JIS K6221.

The amount of carbon black in the tire rubber composition of the present invention is preferably not less than 5 parts by mass, and more preferably not less than 10 parts by mass, per 100 parts by mass of the rubber component. If the amount is less than 5 parts by mass, sufficient reinforcement tends not to be provided. The amount of carbon black is preferably not more than 60 parts by mass, more preferably not more than 50 parts by mass, and further more preferably not more than 30 parts by mass, per 100 parts by mass of the rubber component. If the amount is more than 60 parts by mass, heat build-up tends to be higher.

Generally, use of a mercapto group-containing silane coupling agent disadvantageously results in occurrence of scorch, which leads to deterioration in abrasion resistance although the low heat build-up property is much improved. According to the present invention, a vulcanization accelerator represented by the following formula (7) can be used to prevent scorch and improve the low heat build-up property, wet grip performance, and abrasion resistance in a balanced manner even if a mercapto group-containing silane coupling agent is used. Its use also enables balanced improvement in the low heat build-up property and breaking properties. That is, combination use of the silane coupling agent represented by the formula (4) and the vulcanization accelerator represented by the formula (7) prevents deterioration of abrasion resistance while maintaining wet grip performance and the low heat build-up property at high levels with the benefit of the silane coupling agent represented by the formula (4). Accordingly, the low heat build-up property, wet grip performance, and abrasion resistance can be improved in a balanced manner. In addition, deterioration of breaking properties can be prevented while the low heat build-up property is improved. Hence, these performances can also be improved in a balanced manner.

In the case of using the silane coupling agent that is a copolymer comprising units A represented by the formula (5) and units B represented by the formula (6), wherein the proportion of the units B is 1 to 70 mol % of the total molar amount of the units A and the units B, and the vulcanization accelerator represented by the formula (7) in combination, the vulcanization accelerator represented by the formula (7) and the units A together synergistically prevent scorch and further improve the balance of the low heat build-up property, wet grip performance and abrasion resistance and the balance of the low heat build-up property and breaking properties.

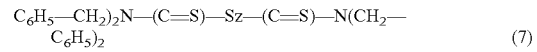

$$C_6H_5-CH_2)_2N-(C=S)-S_z-(C=S)-N(CH_2-C_6H_5)_2 \quad (7)$$

In the formula (7), z is an integer of 1 to 8 (preferably an integer of 1 to 6, and more preferably an integer of 1 to 3).

Examples of the vulcanization accelerator represented by the formula (7) include Nocceler TBzTD (tetrabenzyl thiuram disulfide) and Nocceler TOT-N (tetrakis(2-ethylhexyl) thiuram disulfide) (Ouchi Shinko Chemical Industrial Co., Ltd.). Any of these may be used alone, or two or more of these may be used in combination.

The amount of the vulcanization accelerator represented by the formula (7) is preferably not less than 0.1 parts by mass, and more preferably not less than 0.2 parts by mass, per 100 parts by mass of the rubber component. If the amount is less than 0.1 parts by mass, the vulcanization rate may be low. The amount is preferably not more than 2.0 parts by mass, more preferably not more than 1.6 parts by mass, and further more preferably not more than 1.0 part by mass, per 100 parts by mass of the rubber component. If the amount is more than 2.0 parts by mass, blooming may occur.

In the present invention, other vulcanization accelerators may be used together with the vulcanization accelerator represented by the formula (7). Examples of other vulcanization accelerators usable with the above vulcanization accelerator include: sulfenamide vulcanization accelerators, thiazole vulcanization accelerators, thiuram vulcanization accelerators, thiourea vulcanization accelerators, guanidine vulcanization accelerators, dithiocarbamic acid vulcanization accelerators, aldehyde-amine or aldehyde-ammonia vulcanization accelerators, imidazoline vulcanization accelerators, and xanthate vulcanization accelerators. Among these, sulfenamide vulcanization accelerators are preferable because they enable high initial vulcanization rate.

Examples of the sulfenamide vulcanization accelerators include N-tert-butyl-2-benzothiazolylsulfenamide (TBBS), N-cyclohexyl-2-benzothiazolylsulfenamide (CBS), and N,N'-dicyclohexyl-2-benzothiazolylsulfenamide (DZ). TBBS and CBS are preferable among these because they are comparatively inexpensive.

In addition to the aforementioned ingredients, the rubber composition of the present invention may optionally contain compounding ingredients commonly used in production of rubber compositions. Examples of compounding ingredients include reinforcing fillers such as clay; zinc oxide; stearic acid; various age resistors; oils such as aromatic oils; waxes; vulcanizing agents such as sulfur; and vulcanization accelerators.

Commonly known methods can be employed as the method for producing the rubber composition of the present invention, and for example, the rubber composition can be produced by mixing and kneading the respective ingredients mentioned above with use of a rubber kneader such as an open roll mill or a Banbury mixer, and then vulcanizing the mixture.

The rubber composition of the present invention can be suitably used for various components of a tire (in particular a tread (cap tread), a base tread, and a sidewall).

The pneumatic tire of the present invention can be produced by a common method with use of the above-mentioned rubber composition. More specifically, before vulcanization, the rubber composition of the present invention to which various compounding ingredients are optionally added is extruded and processed into the shape of a tire component (in particular, a tread (cap tread), a base tread, and a sidewall), and then molded in a usual manner on a tire building machine and assembled with other tire components to provide an unvulcanized tire. Then, the unvulcanized tire is heated and pressed in a vulcanizer into the tire.

The tire of the present invention is suitably used for passenger vehicles, busses, trucks, and the like.

EXAMPLES

The present invention will be more specifically described based on examples, but the present invention is not limited to these examples.

In the following, the respective chemical agents used in Production Examples are listed.

Cyclohexane: product of Tokyo Chemical Industry Co., Ltd. (purity: 99.5% or higher)

Styrene: product of Tokyo Chemical Industry Co., Ltd. (purity: 99% or higher)

1,3-Butadiene: product of Tokyo Chemical Industry Co., Ltd.

N,N,N',N'-Tetramethylethylenediamine: product of Wako Pure Chemical Industries, Ltd.

n-Butyl lithium: product of Wako Pure Chemical Industries, Ltd.

Hexane solution of 1,3-divinylbenzene (1.6 M): product of Tokyo Chemical Industry Co., Ltd.

Isopropanol: product of Wako Pure Chemical Industries, Ltd.

2,6-tert-Butyl-p-cresol: product of Wako Pure Chemical Industries, Ltd.

Tetraglycidyl-1,3-bisaminomethylcyclohexane: product of Wako Pure Chemical Industries, Ltd. (compound represented by the following formula (modifying agent))

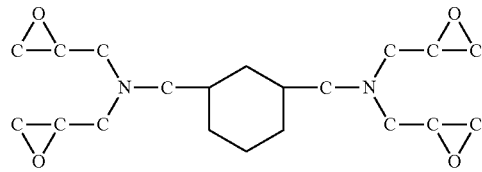 [SMILES: C1CC(CN(CC2CO2)CC2CO2)CC(CN(CC2CO2)CC2CO2)C1]

Methanol: product of Kanto Chemical Co., Inc.

Production Example 1

Preparation of Polymerization Initiator

To a 100 ml pressure-resistant vessel in which air was sufficiently substituted with nitrogen was added 10 ml of the hexane solution of 1,3-divinylbenzene (1.6 M). To the mixture, 20 ml of a hexane solution of n-butyl lithium (1.6 M) was dropwise added at 0° C. and the resulting mixture was stirred for one hour. Thus, a polymerization initiator solution was prepared.

Production Example 2

Preparation of Diene Polymer (1) (Modified Diene Polymer)

To a 1000 ml pressure-resistant vessel in which air was sufficiently substituted with nitrogen were added 600 ml of cyclohexane, 0.12 mol of styrene, 0.8 mol of 1,3-butadiene, and 0.7 mmol of N,N,N',N'-tetramethylethylenediamine. To the mixture, 1.5 ml of the polymerization initiator solution prepared in Production Example 1 was further added, and the resulting mixture was stirred at 40° C. After three hours, 1.0 mmol of tetraglycidyl-1,3-bisaminomethylcyclohexane, which is a modifying agent, was added thereto and the resulting mixture was stirred. After one hour, 3 ml of isopropanol was added to the mixture to terminate the polymerization. After adding 1 g of 2,6-tert-butyl-p-cresol to the reaction solution, the solution was subjected to reprecipitation treatment with methanol, and the precipitate was heated and dried to give a diene polymer (modified diene polymer having two or more modified moieties (e.g. modified ends)).

Production Example 3

Preparation of Diene Polymer (2) (Modified Diene Polymer)

A diene polymer (2) (modified diene polymer having two or more modified moieties (e.g. modified ends)) was prepared in a manner similar to Production Example 2, except styrene was not added.

The prepared diene polymers (1) and (2) were evaluated as follows.

(Mooney Viscosity)

The Mooney viscosity ($ML_{1+4}/100°$ C.) of each diene polymer was determined in accordance with JIS K 6300-1 "Rubber, unvulcanized—Physical property—Part 1: Determination of Mooney viscosity and pre-vulcanization characteristics with Mooney viscometer". That is, a Mooney viscosity tester was preheated for one minute up to 100° C. and a small rotor was rotated under this temperature condition. After four-minute rotation, the Mooney viscosity was determined. Here, the obtained values were rounded to the nearest whole number. This resulted in a Mooney viscosity of 60 for both of the diene polymers (1) and (2).
(Vinyl Content)

The vinyl content of each diene polymer was determined by infrared absorption spectrometry. This resulted in a vinyl content of 57 mol % for the diene polymer (1) and a vinyl content of 20 mol % for the diene polymer (2).

In the following, the respective chemical agents used in Examples and Comparative Examples are listed.

Diene polymer (1): diene polymer (1) prepared in Production Example 2

Diene polymer (2): diene polymer (2) prepared in Production Example 3

SBR: E15 (S-SBR coupled with an epoxy group-containing compound (tetraglycidyl-1,3-bisaminomethylcyclohexane), styrene unit content: 23% by mass, vinyl unit content: 64% by mass, end group: OH (one end-modified SBR), Asahi Kasei Chemicals Corp.)

BR: Nipol BR1220 (cis content: 97% by mass, Zeon Corp.)

NR: RSS#3

Carbon black (1): Diablack I (N220, $N_2SA$: 114 $m^2/g$, DBP oil absorption: 114 ml/100 g, Mitsubishi Chemical Corp.)

Carbon black (2): Diablack H (N330, $N_2SA$: 79 $m^2/g$, DBP oil absorption: 105 ml/100 g, Mitsubishi Chemical Corp.)

Silica: Ultrasil VN3 ($N_2SA$: 175 $m^2/g$, Degussa AG)

Silane coupling agent (1): NXT-Z45 (copolymer of unit A and unit B (unit A: 55 mol %, unit B: 45 mol %), Momentive Performance Materials)

Silane coupling agent (2): Si363 (silane coupling agent represented by the following formula (In the formula (4), $R^8$ is $-O-(C_2H_4-O)_5-C_{13}H_{27}$, $R^9$ is $C_2H_5-O-$, $R^{10}$ is $-O-(C_2H_4-O)_5-C_{13}H_{27}$, and $R^{11}$ is $-C_3H_6-$), Evonik Degussa)

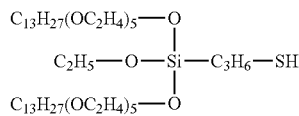

Silane coupling agent (3): Si75 (bis(3-triethoxy silylpropyl)disulfide, Evonik Degussa)

Zinc oxide: Zinc White #1 (Mitsui Mining & Smelting Co., Ltd.)

Stearic acid: stearic acid "Tsubaki" (NOF Corp.)

Aromatic oil: Process X-140 (Japan Energy Corp.)

Age resistor: Antigen 6C (N-(1,3-dimethylbutyl)-N'-phenyl-p-phenylenediamine, Sumitomo Chemical Co., Ltd.)

Wax: SUNNOC N (Ouchi Shinko Chemical Industrial Co., Ltd.)

Sulfur: sulfur powder (Karuizawa Iou K.K.)

Vulcanization accelerator (1): Nocceler CZ (N-cyclohexyl-2-benzothiazolylsulfenamide, Ouchi Shinko Chemical Industrial Co., Ltd)

Vulcanization accelerator (2): Nocceler D (N,N'-diphenylguanidine, Ouchi Shinko Chemical Industrial Co., Ltd)

Vulcanization accelerator (3): Nocceler NS (N-tert-butyl-2-benzothiazolylsulfenamide, Ouchi Shinko Chemical Industrial Co., Ltd.)

Vulcanization accelerator (4): TBzTD (tetrabenzyl thiuram disulfide (in the formula (7), z is 2), Flexsys)

Examples 1 to 6 and Comparative Examples 1 to 6

The chemical agents in formulation amounts shown in Tables 1 and 2, except the sulfur and the vulcanization accelerators, were kneaded with a Banbury mixer at 165° C. for four minutes to provide a kneaded mass. To the kneaded mass were added the sulfur and the vulcanization accelerators and then the mixture was kneaded with an open roll mill at 80° C. for four minutes to provide an unvulcanized rubber composition. Then, the unvulcanized rubber composition was formed into a tread shape, assembled with other tire components, and vulcanized at 150° C. for 35 minutes at 25 kgf to provide a test tire (tire size: 195/65R15).

Each test tire was evaluated as follows. The results are shown in Tables 1 and 2.
(Fuel Economy)

Using a rolling resistance tester, the rolling resistance of each test tire was determined under the running conditions of: a rim of 15×6JJ, an internal pressure of 230 kPa, a load of 3.43 kN, and a speed of 80 km/h. The result of each tire was expressed as an index relative to a value of 100 representing the rolling resistance of Comparative Example 1 or 4. A larger index value corresponds to a higher level of fuel economy.
(Wet Grip Performance)

The wet grip performance was evaluated based on the braking performance determined by an Anti-Lock Brake System (ABS) evaluation test. Specifically, each set of test tires was mounted on a 1800-cc class passenger vehicle equipped with an ABS, and the vehicle was driven on an asphalt road (condition of road surface: wet, skid number: approximately 50). Then, the brake was stepped on when the speed was 100 km/h, and the distance traveled until the vehicle stopped (stopping distance) was measured. The wet grip performance index of Comparative Example 1 or 4 was regarded as 100, and the stopping distance of each formulation was expressed as a wet grip performance index by the following equation. A larger wet grip performance index value corresponds to a higher level of the braking performance on a wet road, that is, a higher level of wet grip performance.

(Wet grip performance index)=(Stopping distance of Comparative Example 1 or 4)/(Stopping distance of each formulation)×100

(Abrasion Resistance)

Each set of test tires was mounted on a 1800-cc class passenger vehicle equipped with an ABS, and the decrease in the depth of tire grooves was measured after the vehicle had run 30000 km in a city area. Then, the running distance that decreased the depth of tire grooves by 1 mm was calculated. Based on the abrasion resistance index of Comparative Example 1 or 4 regarded as 100, the result obtained from the decrease in the depth of tire grooves of each formulation was expressed as an index by the following equation. A larger abrasion resistance index value corresponds to a higher level of abrasion resistance. (Abrasion resistance index)=(Running distance that decreased tire groove depth by 1 mm for each formulation)/(Running distance that decreased tire groove depth by 1 mm for Comparative Example 1 or 4)×100

TABLE 1

Formulations for tread (cap tread)

| | Example 1 | Example 2 | Example 3 | Comparative Example 1 | Comparative Example 2 | Comparative Example 3 |
|---|---|---|---|---|---|---|
| Ingredients (part(s) by mass) | | | | | | |
| Diene polymer (1) | 100 | 80 | 80 | — | — | — |
| SBR | — | — | — | 100 | 80 | 80 |
| BR | — | 20 | — | — | 20 | — |
| NR | — | — | 20 | — | — | 20 |
| Silica | 75 | 75 | 75 | 75 | 75 | 55 |
| Carbon black (1) | 10 | 10 | 10 | 10 | 10 | 30 |
| Silane coupling agent (1) | 6 | 6 | 6 | 6 | 6 | 4.4 |
| Zinc oxide | 3 | 3 | 3 | 3 | 3 | 3 |
| Stearic acid | 2 | 2 | 2 | 2 | 2 | 2 |
| Age resistor | 2 | 2 | 2 | 2 | 2 | 2 |
| Wax | 2 | 2 | 2 | 2 | 2 | 2 |
| Aromatic oil | 20 | 20 | 20 | 20 | 20 | 20 |
| Sulfur | 1.8 | 1.8 | 1.8 | 1.8 | 1.8 | 1.8 |
| Vulcanization accelerator (1) | 1.2 | 1.2 | 1.2 | 1.2 | 1.2 | 1.2 |
| Vulcanization accelerator (2) | 1 | 1 | 1 | 1 | 1 | 0.5 |
| Evaluation | | | | | | |
| Fuel economy | 105 | 108 | 110 | 100 | 103 | 103 |
| Wet grip performance | 110 | 103 | 105 | 100 | 93 | 95 |
| Abrasion resistance | 105 | 110 | 108 | 100 | 105 | 102 |

TABLE 2

Formulations for tread (cap tread)

| | Example 4 | Example 5 | Example 6 | Comparative Example 4 | Comparative Example 5 | Comparative Example 6 |
|---|---|---|---|---|---|---|
| Ingredients (part(s) by mass) | | | | | | |
| Diene polymer (1) | 100 | 80 | 80 | — | — | — |
| SBR | — | — | — | 100 | 80 | 80 |
| BR | — | 20 | — | — | 20 | — |
| NR | — | — | 20 | — | — | 20 |
| Silica | 75 | 75 | 75 | 75 | 75 | 55 |
| Carbon black (1) | 10 | 10 | 10 | 10 | 10 | 30 |
| Silane coupling agent (2) | 6 | 6 | 6 | 6 | 6 | 4.4 |
| Zinc oxide | 3 | 3 | 3 | 3 | 3 | 3 |
| Stearic acid | 2 | 2 | 2 | 2 | 2 | 2 |
| Age resistor | 2 | 2 | 2 | 2 | 2 | 2 |
| Wax | 2 | 2 | 2 | 2 | 2 | 2 |
| Aromatic oil | 20 | 20 | 20 | 20 | 20 | 20 |
| Sulfur | 1.8 | 1.8 | 1.8 | 1.8 | 1.8 | 1.8 |
| Vulcanization accelerator (3) | 1.2 | 1.2 | 1.2 | 1.2 | 1.2 | 1.2 |
| Vulcanization accelerator (4) | 0.5 | 0.5 | 0.5 | 0.5 | 0.5 | 0.5 |
| Evaluation | | | | | | |
| Fuel economy | 106 | 113 | 111 | 100 | 104 | 103 |
| Wet grip performance | 110 | 103 | 105 | 100 | 93 | 95 |
| Abrasion resistance | 105 | 110 | 108 | 100 | 105 | 102 |

The rubber compositions of Examples 1 to 6 which contained the specific modified diene polymer and silica were excellent in the low heat build-up property (fuel economy), wet grip performance, and abrasion resistance. Compared to those of Examples, the rubber compositions of Comparative Examples 1 to 6 without the specific diene polymer were poor in these performances.

Examples 7 to 24 and Comparative Examples 7 to 14

An unvulcanized rubber composition was produced using the ingredients in formulation amounts shown in Tables 3 and 4 in a manner similar to that of Example 1. Each produced unvulcanized rubber composition was press-vulcanized at 170° C. for 12 minutes into a vulcanized rubber composition (vulcanized rubber sheet).

Each vulcanized rubber sheet was evaluated as follows. The results are shown in Tables 3 and 4.

(Viscoelasticity Test)

The loss tangent (tan δ) of each vulcanized rubber sheet was measured at 70° C. using a sample (length: 40 mm, width: 4 mm) cut out from each vulcanized rubber sheet by a viscoelasticity spectrometer (Iwamoto Seisakusho Co., Ltd.) under conditions of: 10 Hz in frequency; 10% in initial strain; and 2% in dynamic strain. The tan δ of each formulation was expressed as an index calculated by the following equation. A larger index value corresponds to a lower heat build-up, that is, a higher level of the low heat build-up property.

(Low heat build-up property index)=(Tan δ of Comparative Example 7 or 11)/(Tan δ of each formulation)×100

(Tensile Test)

A No. 3 dumbbell specimen prepared from each vulcanized rubber sheet was subjected to tensile tests in accordance with JIS K6251 "Rubber, vulcanized or thermoplastic—Determination of tensile stress-strain properties". The tensile strength at break (TB) and elongation at break (EB) were measured and the breaking energy (TB×EB/2) was then calculated therefrom. The breaking energy of each formulation was expressed as an index calculated by the following equation. A larger index value corresponds to a higher mechanical strength. (Breaking energy index)=(Breaking energy of each formulation)/(Breaking energy of Comparative Example 7 or 11)×100

TABLE 3

Formulations for base tread

| Ingredients (part(s) by mass) | Example 7 | Example 8 | Example 9 | Example 10 | Example 11 | Example 12 | Example 13 | Example 14 | Example 15 | Comparative Example 7 | Comparative Example 8 | Comparative Example 9 | Comparative Example 10 |
|---|---|---|---|---|---|---|---|---|---|---|---|---|---|
| Diene polymer (2) | 30 | 30 | 30 | 30 | 30 | 30 | 30 | 30 | 30 | — | — | — | — |
| BR | — | — | — | — | — | — | — | — | — | 30 | 30 | 30 | 30 |
| NR | 70 | 70 | 70 | 70 | 70 | 70 | 70 | 70 | 70 | 70 | 70 | 70 | 70 |
| Silica | 20 | 30 | 40 | 20 | 30 | 40 | 20 | 30 | 40 | — | 30 | 30 | 30 |
| Carbon black (2) | 30 | 20 | 10 | 30 | 20 | 10 | 30 | 20 | 10 | 50 | 20 | 20 | 20 |
| Silane coupling agent (1) | — | — | — | — | — | — | 1.6 | 2.4 | 3.2 | — | — | — | 2.4 |
| Silane coupling agent (2) | — | — | — | 1.6 | 2.4 | 3.2 | — | — | — | — | — | 2.4 | — |
| Silane coupling agent (3) | 1.6 | 2.4 | 3.2 | — | — | — | — | — | — | — | 2.4 | — | — |
| Zinc oxide | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 |
| Age resistor | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 | 2 | 2 |
| Vulcanization accelerator (1) | 1.5 | 1.5 | 1.5 | 1.5 | 1.5 | 1.5 | 1.5 | 1.5 | 1.5 | 1.5 | 1.5 | 1.5 | 1.5 |
| Vulcanization accelerator (2) | 0.6 | 0.6 | 0.6 | — | — | — | 0.6 | 0.6 | 0.6 | — | 0.6 | — | 0.6 |
| Vulcanization accelerator (4) | — | — | — | 0.3 | 0.3 | 0.3 | — | — | — | — | — | 0.3 | — |
| Evaluation | | | | | | | | | | | | | |
| Low heat build-up property | 108 | 110 | 112 | 115 | 117 | 119 | 112 | 114 | 116 | 100 | 103 | 110 | 107 |
| Breaking energy | 104 | 106 | 108 | 100 | 102 | 104 | 102 | 104 | 106 | 100 | 99 | 95 | 97 |

TABLE 4

Formulations for sidewall

| Ingredients (part(s) by mass) | Example 16 | Example 17 | Example 18 | Example 19 | Example 20 | Example 21 | Example 22 | Example 23 | Example 24 | Comparative Example 11 | Comparative Example 12 | Comparative Example 13 | Comparative Example 14 |
|---|---|---|---|---|---|---|---|---|---|---|---|---|---|
| Diene polymer (2) | 60 | 60 | 60 | 60 | 60 | 60 | 60 | 60 | 60 | — | — | — | — |
| BR | — | — | — | — | — | — | — | — | — | 60 | 60 | 60 | 60 |
| NR | 40 | 40 | 40 | 40 | 40 | 40 | 40 | 40 | 40 | 40 | 40 | 40 | 40 |
| Silica | 20 | 30 | 40 | 20 | 30 | 40 | 20 | 30 | 40 | — | 30 | 30 | 30 |
| Carbon black (2) | 30 | 20 | 10 | 30 | 20 | 10 | 30 | 20 | 10 | 50 | 20 | 20 | 20 |
| Silane coupling agent (1) | — | — | — | — | — | — | 1.6 | 2.4 | 3.2 | — | — | — | 2.4 |
| Silane coupling agent (2) | — | — | — | 1.6 | 2.4 | 3.2 | — | — | — | — | — | 2.4 | — |
| Silane coupling agent (3) | 1.6 | 2.4 | 3.2 | — | — | — | — | — | — | — | 2.4 | — | — |
| Zinc oxide | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 |
| Age resistor | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 |
| Aromatic oil | 5 | 5 | 5 | 5 | 5 | 5 | 5 | 5 | 5 | 5 | 5 | 5 | 5 |
| Sulfur | 2 | 2 | 2 | 2 | 2 | 2 | 2 | 2 | 2 | 2 | 2 | 2 | 2 |
| Vulcanization accelerator (1) | 1.5 | 1.5 | 1.5 | 1.5 | 1.5 | 1.5 | 1.5 | 1.5 | 1.5 | 1.5 | 1.5 | 1.5 | 1.5 |
| Vulcanization accelerator (2) | 0.6 | 0.6 | 0.6 | — | — | — | 0.6 | 0.6 | 0.6 | — | 0.6 | — | 0.6 |
| Vulcanization accelerator (4) | — | — | — | 0.3 | 0.3 | 0.3 | — | — | — | — | — | 0.3 | — |

TABLE 4-continued

Formulations for sidewall

|  | Example 16 | Example 17 | Example 18 | Example 19 | Example 20 | Example 21 | Example 22 | Example 23 | Example 24 | Comparative Example 11 | Comparative Example 12 | Comparative Example 13 | Comparative Example 14 |
|---|---|---|---|---|---|---|---|---|---|---|---|---|---|
| Evaluation |
| Low heat build-up property | 107 | 110 | 113 | 117 | 120 | 123 | 112 | 115 | 118 | 100 | 105 | 115 | 110 |
| Breaking energy | 108 | 110 | 112 | 100 | 102 | 104 | 105 | 107 | 109 | 100 | 98 | 90 | 95 |

As shown in Tables 3 and 4, the rubber compositions of Examples 7 to 24 which contained the specific modified diene polymer and silica were excellent in the low heat build-up property and breaking energy (rubber strength). Compared to those of Examples, the rubber compositions of Comparative Examples 7 to 14 without the specific diene polymer were poor in these performances.

The invention claimed is:

1. A tire rubber composition comprising:

a rubber component including a diene polymer;

silica; and a silane coupling agent represented by the following formula (4); and/or a silane coupling agent that is a copolymer comprising units A represented by the following formula (5) and units B represented by the following formula (6), wherein the proportion of the units B is 1 to 70 mol % of the total molar amount of the units A and the units B:

(4)

wherein $R^8$ represents a group represented by the formula: —O—$(R^{12}$—O$)_m$—R13, m $R^{12}$s may be the same as or different from each other and each represents a branched or unbranched $C_{1-30}$ divalent hydrocarbon group, $R^{13}$ represents a branched or unbranched $C_{1-30}$ alkyl group, a branched or unbranched $C_{2-30}$ alkenyl group, a $C_{6-30}$ aryl group, or a $C_{7-30}$ aralkyl group, and m is an integer of 1 to 30; $R^9$ and $R^{10}$ are the same as or different from each other and each represents the same group as $R^8$, or a branched or unbranched $C_{1-12}$ alkyl group or a group represented by the formula —O—$R^{14}$, and $R^{14}$ represents a hydrogen atom, a branched or unbranched $C_{1-30}$ alkyl group, a branched or unbranched $C_{2-30}$ alkenyl group, a $C_{6-30}$ aryl group, or a $C_{7-30}$ aralkyl group; and $R^{11}$ represents a branched or unbranched $C_{1-30}$ alkylene group,

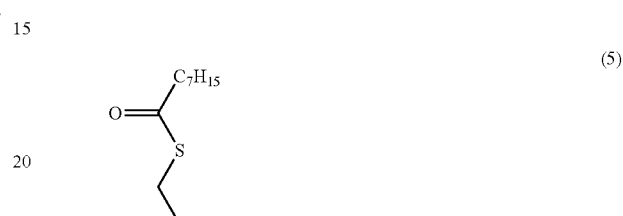

(5)

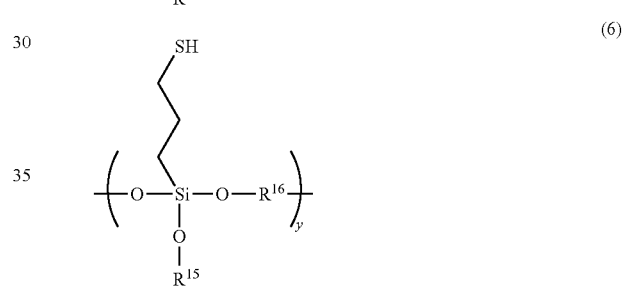

(6)

wherein x and y each represent an integer of 1 or larger; $R^{15}$ represents hydrogen, a halogen, or a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group obtained by replacing the end of the alkyl or alkenyl group with a hydroxy or carboxyl group; $R^{16}$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group; and $R^{15}$ and $R^{16}$ may form a ring together, the diene polymer being a modified diene polymer obtained by reacting a compound (A) and a compound (B), the compound (A) being an active alkali metal-terminated conjugated diene polymer obtained by polymerizing a conjugated diene monomer alone or with an aromatic vinyl monomer, in the presence of a compound (C), the compound (B) being a modifying agent having a functional group, and the compound (C) being a chemical species obtained by reacting an organic alkali metal compound with a compound represented by the following formula (1):

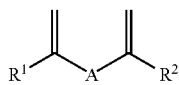

(1)

wherein $R^1$ and $R^2$ are the same as or different from each other and each represents a hydrogen atom, a branched or unbranched alkyl group, an aryl group, a branched or unbranched alkoxy group, a branched or unbranched silyloxy group, a branched or unbranched acetal group, a carboxyl group, a mercapto group, or a derivative thereof; and A represents a branched or unbranched alkylene group, an arylene group, or a derivative thereof.

2. The tire rubber composition according to claim 1, wherein the compound represented by the formula (1) is a compound represented by the following formula (2)

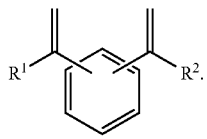

(2)

3. The tire rubber composition according to claim 1, wherein the modifying agent is a compound represented by the following formula (3):

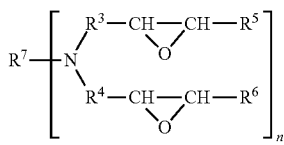

(3)

wherein $R^3$ and $R^4$ are the same as or different from each other and each represents a $C_{1-10}$ hydrocarbon group, and the hydrocarbon group may have at least one selected from the group consisting of an ether group and a tertiary amine group; $R^5$ and $R^6$ are the same as or different from each other and each represents a hydrogen atom or a $C_{1-20}$ hydrocarbon group, and the hydrocarbon group may have at least one selected from the group consisting of an ether group and a tertiary amine group; $R^7$ represents a $C_{1-20}$ hydrocarbon group, and the hydrocarbon group may have at least one selected from the group consisting of an ether group, a tertiary amine group, an epoxy group, a carbonyl group, and a halogen; and n is an integer of 1 to 6.

4. The tire rubber composition according to claim 1, wherein the compound (B) is a single modifying agent, and the modifying agent is introduced into both ends of the active conjugated diene polymer.

5. The tire rubber composition according to claim 1, wherein the amount of the diene polymer is not less than 5% by mass in 100% by mass of the rubber component.

6. The tire rubber composition according to claim 1, wherein the conjugated diene monomer is 1,3-butadiene and/or isoprene, and the aromatic vinyl monomer is styrene.

7. The tire rubber composition according to claim 1, wherein the silica has a nitrogen adsorption specific surface area of 40 to 250 $m^2/g$.

8. The tire rubber composition according to claim 1, further comprising:
a vulcanization accelerator represented by the following formula (7):

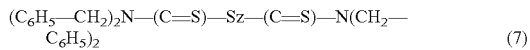

(7)

wherein z is an integer of 1 to 8.

9. A tire having a tread formed from the rubber composition according to claim 1.

10. A tire having a cap tread formed from the rubber composition according to claim 1.

11. The tire according to claim 9 or 10, wherein the modified diene polymer is a modified styrene-butadiene rubber obtained by polymerizing 1,3-butadiene and styrene.

12. The tire rubber composition according to claim 1, wherein the tire rubber composition is used as a rubber composition for a base tread and/or a sidewall, and the modified diene polymer is obtained by polymerizing the conjugated diene monomer.

13. The tire rubber composition according to claim 12, wherein the modified diene polymer is a modified butadiene rubber obtained by polymerizing 1,3-butadiene.

14. A pneumatic tire comprising one or more tire components produced from the tire rubber composition according to claim 1.

15. The pneumatic tire according to claim 14, wherein the one or more tire components comprise at least one selected from the group consisting of a cap tread, a base tread and a sidewall.

16. The tire rubber composition according to claim 1, further comprising: a natural rubber.

* * * * *